(12) United States Patent
Johnson

(10) Patent No.: US 10,050,792 B1
(45) Date of Patent: *Aug. 14, 2018

(54) PROVIDING CROSS SITE REQUEST FORGERY PROTECTION AT AN EDGE SERVER

(71) Applicant: CLOUDFLARE, INC., San Francisco, CA (US)

(72) Inventor: Evan Johnson, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,151

(22) Filed: Sep. 5, 2017

Related U.S. Application Data

(63) Continuation of application No. 15/432,891, filed on Feb. 14, 2017, now Pat. No. 9,755,834.

(51) Int. Cl.
*H04L 9/32* (2006.01)
*H04L 9/08* (2006.01)
*H04L 9/06* (2006.01)
*H04L 29/06* (2006.01)
*H04L 29/08* (2006.01)
*H04L 29/12* (2006.01)

(52) U.S. Cl.
CPC .......... *H04L 9/3236* (2013.01); *H04L 9/0643* (2013.01); *H04L 9/0872* (2013.01); *H04L 61/2007* (2013.01); *H04L 63/08* (2013.01); *H04L 63/108* (2013.01); *H04L 63/1466* (2013.01); *H04L 67/02* (2013.01); *H04L 67/18* (2013.01)

(58) Field of Classification Search
CPC ................................. H04L 9/32; H04L 63/08
See application file for complete search history.

(56) References Cited

U.S. PATENT DOCUMENTS

2015/0319189 A1* 11/2015 Maher ..................... H04L 63/08
726/22
2017/0041144 A1* 2/2017 Krapf .................... H04L 9/3234

* cited by examiner

*Primary Examiner* — Izunna Okeke
(74) *Attorney, Agent, or Firm* — Nicholson De Vos Webster & Elliott LLP

(57) ABSTRACT

A request from a computing device for accessing a resource is received by an edge server, where the request includes a cookie containing a first token value and a second token value. The edge server validates the first token value and a second token value using a third token value generated using hashing algorithm with a secret key and one or more other values. The edge server then compares the received token values with the third token value. When the request is validated, the edge server retrieves the request resource.

15 Claims, 4 Drawing Sheets

PROVIDING CROSS SITE REQUEST FORGERY PROTECTION AT AN EDGE SERVER

CROSS-REFERENCE TO RELATED APPLICATIONS

This application is a continuation of application Ser. No. 15/432,891, filed Feb. 14, 2017, which is hereby incorporated by reference.

FIELD

Embodiments of the invention relate to the field of network communications; and more specifically, to using a hash value to verify requests to prevent unauthorized data accessing.

BACKGROUND

Cross site request forgery (commonly abbreviated as both "CSRF" and "XSRF") is a common web vulnerability. CSRF occurs when attackers are able to transmit unauthorized or malicious requests to a website from a user that the website trusts. In some cases, CSRF attacks can force the user to perform state changing requests like transferring bank account funds, changing email addresses or passwords, and other unwanted modifications or transferences of data.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
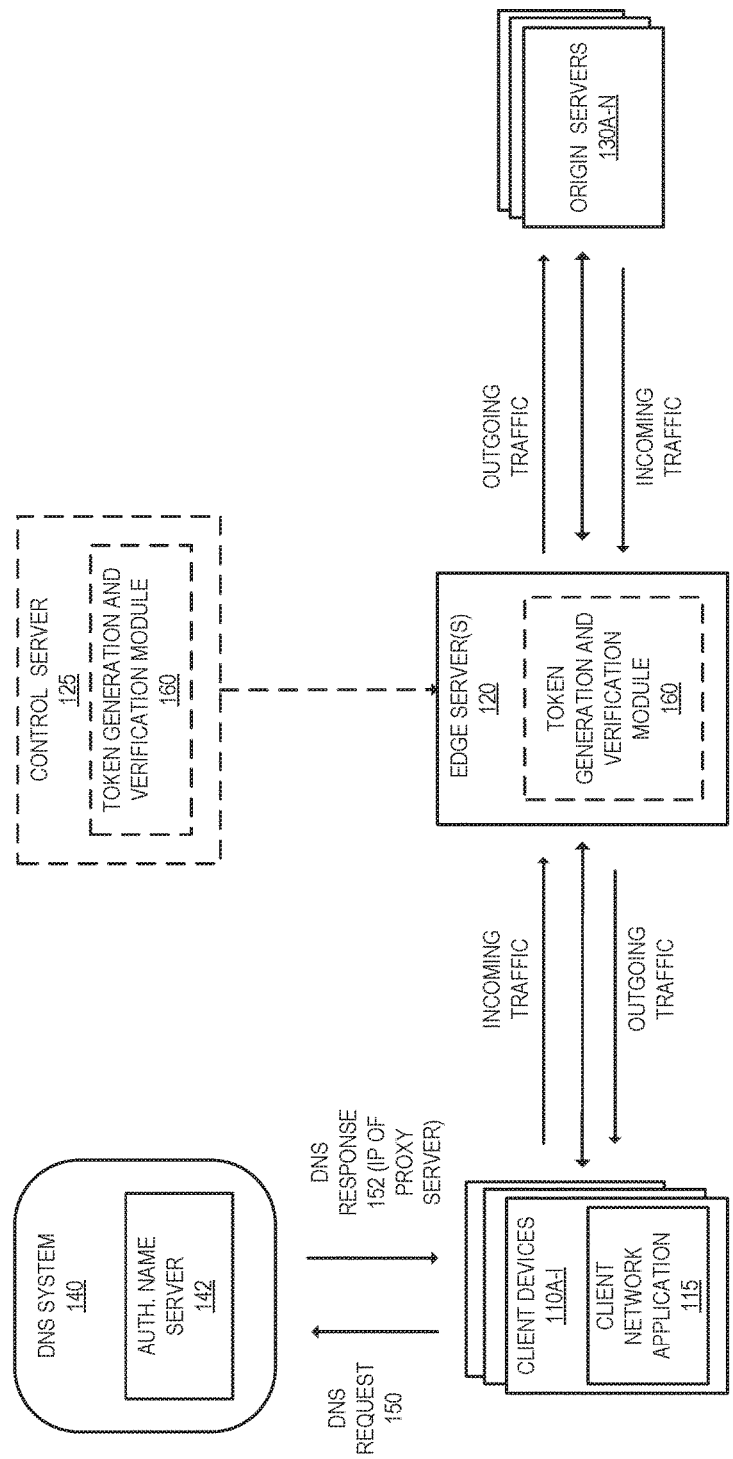
FIG. 1 illustrates an exemplary system according to some embodiments described herein.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In an embodiment, an edge server provides CSRF protection at the edge. The edge server generates a token value using a secret key and one or more other values. For example, in a specific embodiment, the edge server may generate the token value including using a hashing algorithm to hash a secret key, an expiration time and one or more of an IP address, a browser identifier, a host origin name, geo-location data, a device identifier, a user agent string, and other authentication data. The token value may also include an expiration time value either prepended or appended to the hash value. The token value may be valid for a period time as specified by the expiration time used to generate the token value. The token value is subsequently sent to a client computing device. For example, the token value may be set as a cookie value and sent to the client computing device.

In an embodiment, the edge server may perform a verification process to determine whether a received request is a valid request. For example, when the edge server receives a request from the client computing device for a resource, prior to processing the request, the edge server may determine whether the request includes the token value as a cookie and also as part of the request itself (e.g., in a custom header or the body of the request). The edge server may also determine the type of the request and whether the request is a state-changing request, and drop those requests that are not a state-changing request. The edge server may generate a verification token value using the same hash algorithm to hash the secret key, expiration time (extracted from the token value from the cookie), and the same one or more of the IP address, browser identifier, host origin name, geo-location data, a device identifier, a user agent string, and other authentication data used when generating the token value. The edge server compares the token value in the cookie and the token value included in the request with the generated verification token value. When both the token values match the generated verification token value, the request is processed normally. When the token values do not match, the request may not be processed.

Embodiments of the invention provide many technical advantages. For example, performing the CSRF protection at the edge server instead of at the origin server saves bandwidth throughout a network by preventing the sending of data requests that are determined to not pass the CSRF protection and could be an attack or malicious exploitation of a network resource. In addition, by preventing these types of attacks from reaching the origin server associated with the request, computing resources of the origin server are saved through preventing the origin server from having to process these requests. For example, the origin server does not have to dedicate resources to handling security threats posed by CSRF.

In addition, in some embodiments, by performing the CSRF protection at an edge server, website owners do not have to change the code associated with their resources (e.g., websites). The edge server is able to maintain and perform the operations to execute the CSRF protection. In this manner, by performing the CSRF protection on behalf of all traffic that arrives at the edge server, the CSRF protection afforded by the edge server is consistent and uniform without regard to the website or resource, and without requiring the website owners to modify their code.

FIG. 1 illustrates an exemplary network architecture that use embodiments described herein. The service illustrated in FIG. 1 includes a set of edge server(s) 120 that are situated between the client computing devices 110A-I and the origin server(s) 130A-N. In one embodiment, the edge server(s) 120 are reverse proxy servers. Certain network traffic is received and processed through the set of edge server(s) 120. For example, web traffic (e.g., HTTP requests/responses, HTTPS requests/responses, SPDY requests/responses, HTTP/2 requests, responses, etc.) for domains handled by the origin servers 130A-N may be received and processed at the edge server(s) 120. In one embodiment, domain owners are customers of the cloud-based edge service and certain network traffic for their websites are received and processed at the edge server(s) 120.

The client devices 110A-I are computing devices (e.g., laptops, workstations, smartphones, palm tops, mobile phones, tablets, gaming systems, set top boxes, wearable devices, etc.) that are capable of transmitting and/or receiving network traffic. Each of the client devices 110A-I executes a client network application that is capable of transmitting and/or receiving network traffic. For example, the client network application may be a web browser or other application that can access network resources (e.g., web pages, images, word processing documents, PDF files, movie files, music files, or other computer files) using the client network application. The client devices 110A-I may each make a DNS request 150 to the DNS system 140 for a particular hostname and receive a DNS response 152 that includes an IP address of the edge server(s) 120.

The origin servers 130A-N are computing devices that may serve and/or generate network resources (e.g., web pages, images, word processing documents, PDF files movie files, music files, or other computer files). An origin server 130A-N may also be another edge server to the server that serves and/or generates network resources. Although not illustrated in FIG. 1, it should be understood that the network resources of the origin servers 130A-N may be stored separately from the device that responds to the requests. Some of the origin servers 130A-N may handle multiple domains that resolve to the edge server(s) 120. For example, a single origin server 130 may handle multiple domains owned by the same domain owner or different domain owners through use of virtual hosting. In one embodiment, the virtual hosting is name-based virtual hosting where multiple websites (domains), which may or may not be owned or operated by the same domain owner, are hosted on the same IP address.

The service may provide different services for customers. By way of example, the service may provide services including protecting against Internet-based threats (e.g., proactively stopping botnets, cleaning viruses, Trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In an embodiment and as described in greater detail later herein, the service generates and verifies token values received by the edge server(s) 120 in requests. The service uses a hashing algorithm to generate token values to send to client devices 110A-I, and verifies token values received from the client devices 110A-I.

The DNS system 140 is used to refer to the DNS system as a whole and includes multiple DNS servers to resolve DNS requests. As illustrated, the DNS system 140 includes the authoritative name server 142, which is an authoritative name server for the service. The authoritative name server 142 may be the authoritative name server for the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed.

Although not illustrated in FIG. 1, in one embodiment the service includes multiple nodes (referred herein as "edge service nodes"). Each edge service node may include any of one or more edge servers, one or more control servers, one or more DNS servers (e.g., one or more authoritative name servers), and one or more other pieces of networking equipment (e.g., one or more routers, switches, hubs, etc.). The edge service node may be part of the same physical device or multiple physical devices. For example, the edge server (s), control server(s), and DNS server(s) may be virtual instances running on the same physical device or may be separate physical devices. Each edge service node may be part of a data center or a collocation site.

The service may also include the control server 125, which may be owned or operated by the service. In one embodiment, the control server 125 provides a set of tools and interfaces for customers (e.g., domain owners) to configure security settings of the service. In some embodiments the control server 125 may be used to send a command to the edge server(s) 120 to perform the CSRF protection described herein. For example, the control server 125 may receive a command from a website owner of a website handled by the origin server 130 to perform the CSRF protection for resources associated with the origin server 130. In some embodiments, CSRF protection is enabled as a result of the control server 125 receiving an indication of a selection to enable CSRF protection (e.g., via a button selection or a toggle switched to an "on" or "enabled" position). In some embodiments, the selection of the toggle switch causes the edge server 120 to modify code associated with a resource to enable CSRF. Similarly, CSRF protection may be disabled as the result of the control server 125 receiving an indication of a selection to disable CSRF protection (e.g., via a button selection or a toggle switch of the button or the toggle switched to an "off" or "disabled" position).

In some embodiments, the service includes multiple edge servers that are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL ("time to live")

value as provided by the authoritative name server). In some embodiments, instead of using an anycast mechanism, embodiments use a geographical load balancer to route traffic to the nearest edge service node.

To provide CSRF protection, the service generates and verifies token values received in requests by the edge server(s) 120. For instance, the control server 125 and/or the edge server(s) 120 include a token generation and verification module 160 that is configured to generate and send token values to client computing devices 110A-I and verify token values received from the client computing devices 110A-I in requests to access and/or modify resources handled by the origin servers 130A-N.

Figure 2:
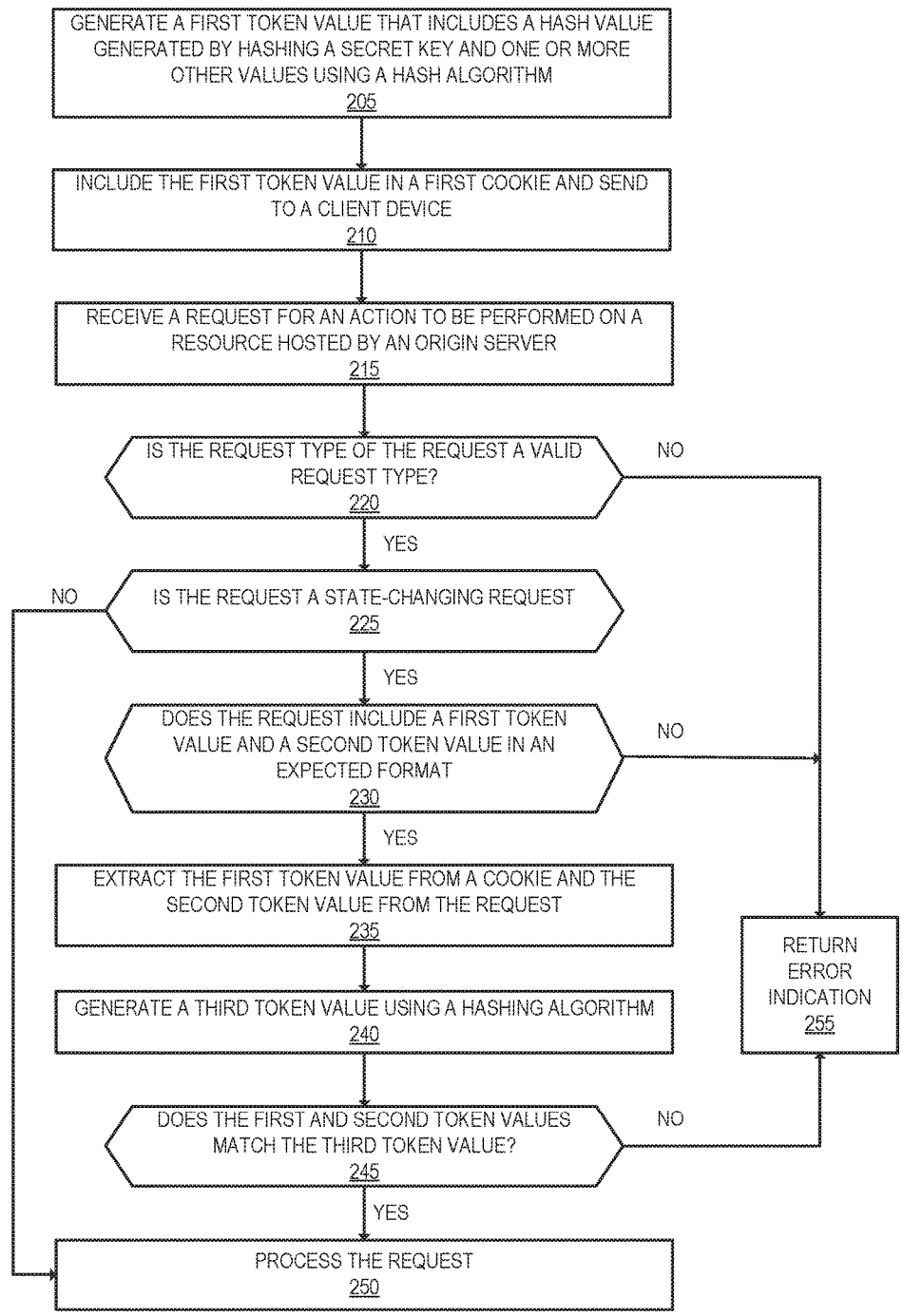
FIG. 2 is a flow diagram that illustrates exemplary operations for providing CSRF protection, according to an embodiment.

FIG. 2 is a flow diagram that illustrates exemplary operations for providing CSRF protection according to an embodiment. The operations of FIG. 2 and other flow diagrams will be described with reference to the exemplary embodiment of FIG. 1. However, it should be understood that the operations of FIG. 2 and the other flow diagrams can be performed by embodiments of the invention other than those discussed with reference to FIG. 1, and the embodiments discussed with reference to FIG. 1 can perform operations different than those discussed with reference to FIG. 2 and the other flow diagrams.

At operation 205, an edge server 120 generates a first token value that includes a hash value generated by hashing a secret key and one or more other values using a hash algorithm. The secret key may be a uniform shared secret for all websites or each website may have its own unique secret key. Where each website has its own secret key, the edge server 120 may store the secret key in a profile associated with the corresponding website. The secret key may be a value used for symmetric encryption. In one embodiment, the secret key is known only by the edge server 120 and is not sent to the client computing device 110. The one or more other values may include one or more of: an expiration time and metadata, including an IP address, a browser identifier, a host origin name, geo-location data, a device identifier, a user agent string, and other authentication data. The first token value may also include the expiration time value either prepended or appended to the hash value. For example, the format of a portion of the first token value may be expressed as:

expiration_time-{HASH(secret_key,IP_address,user_agent_string)} where the expiration_time is prepended to the hash value and is in a simple text format.

In some embodiments, the hash algorithm is a cryptographic hash algorithm, including, but not limited to, SHA-1, SHA-2, MD5, Whirlpool, and any other appropriate cryptographic hash algorithms, as would be understood by one of ordinary skill in the art.

In one example, the edge server 120 may generate the first token value in response to detecting that a client computing device 110 has requested access to a resource (e.g., via a "GET" request to access a resource hosted by an origin server 130). In other examples, the edge server 120 may generate the first token value in response to the user providing credentials to the website (e.g., a login and password).

Next, the flow moves to operation 210, where the edge server 120 includes the first token value in a first cookie. The edge server 120 may include the expiration time as part of the first token value. For example, the expiration time may be prepended or appended to the hash value as part of the first token value. Subsequently, the edge server 120 sends the first cookie to the client computing device 110.

In one embodiment, the edge server 120 may generate an updated or new first token value. For example, in scenarios where the edge server 120 does not receive a request from the client computing device 110 prior to the passage of the expiration time associated with the first token value, the first token value may be noted as expired and a new first token value subsequently generated and sent to the client computing device 110 in a manner similar to that described above.

At operation 215, the edge server 120 receives a request from the client computing device 110. The request may be a request for an action to be performed on a resource hosted by the origin server 130. The request may be a non-state-changing request such as a GET request, or a state-changing request that is to modify a record, information, or perform an action such as POST, DELETE, PUT, and PATCH. The request may be received at the edge server 120 as a result of a DNS for the hostname resolving to an IP address of the edge server 120 instead of resolving to an IP address of the origin server 130.

The request received from the client computing device 110 may include a second cookie and a second token value. The value of the second cookie should be the same as the value of the first cookie set by the edge server 120. In some embodiments, the edge server 120 may modify code of the resource to cause the second token value to be transmitted to the edge server 120. For example, the edge server 120 may modify the code of the resource to include a client-side script that, when executed by the client computing device 110, causes the client computing device 110 to transmit the second token value as part of the request. For example, the second token value may be submitted automatically as an HTTP request header, or as part of HTML form data by adding a hidden field to an HTML form on the resource.

In some embodiments, where the second token value are sent as an AJAX (Asynchronous JavaScript and XML) submission, injected JavaScript can also overwrite the JavaScript XMLHttpRequest object prototype to add or include the appropriate HTTP header. This may be performed for AJAX requests that may be made in the future to the origin server 130.

At operation 220, the edge server 120 determines whether the request type of the received request is a valid request type. For example, the edge server 120 may access a list of members of valid HTTP verbs, and extract the request type from the received request. The edge server 120 determines whether or not the extracted request type of the received request is one of those on the list of members of the valid HTTP verbs. When the edge server 120 determines that the request type of the received request is not a valid request type, the flow continues to operation 255. In operation 255, the edge server may return an error indication to the client computing device 110 indicating that the request failed or was denied. In addition, the edge server 120 does not process the request received from the client computing device 110 or send the HTTP request to the origin server 130.

At operation 225, after determining that the request type of the request is a valid request type, the edge server 120 determines whether the request is a state-changing request or a non-state changing request. State-changing requests include modification to data or storage, such as posting of data to a website, uploading a file, and deleting data, and include POST, DELETE and PUT requests, among others. Non-state-changing requests retrieve data but have no effect on the data, and include GET and HEAD requests. The edge server 120 may determine whether the request is a state-changing request based on the type of HTTP verb used in the request.

When the request is determined to be a non-state-changing request, the flow continues to operation 250, where the request may be processed without requiring the verification of any token value. In some embodiments, the request may include a token value, as a cookie and in a custom request header or in the body of the request, but when the request type of the request is a non-state-changing request, the edge server 120 may ignore the presence of the token and process the received request.

When the request is determined to be a state-changing request, the flow continues to operation 230. In operation 230, the edge server 120 determines whether the request includes a first token value and a second token value in an expected format. The first token value and the second token value are expected to be identical to the token value sent by the edger server 120 to the client computing device 110. The edge server 120 may determine whether the cookie itself is in an expected format, or whether the second token value is in an expected format. For example, in one embodiment, the edge server 120 determines whether the first token value was sent in a cookie sent with the request, and that the second token value was sent in either a custom header of the request or within the body of the request itself. When the edge server 120 determines that the request does not include the first token value and the second token value in the expected format, the flow continues to operation 255, as described above.

At operation 235, the edge server 120 extracts the first token value from the cookie and the second token value from the request. The first token value may be extracted from a cookie sent with the request, while the second token value may be extracted from the request. For example, the edge server 120 may access a field in a custom header of the request containing the second token value. In another example, the edge server 120 may access a portion of the body of the request containing the second token value. In one embodiment, the second token value may be sent separately from the client computing device 110 to the edge server 120 via a client-side script. In other embodiments, the second token value may be sent to the edge server 120 in another manner, as would be understood by one of ordinary skill in the art.

At operation 240, the edge server 120 generates a third token value using a hashing algorithm. The edge server 120 generates the third token value by hashing a secret key and one or more other values derived from the request, using the hash algorithm. The secret key may be a uniform shared secret value for all websites. In examples where the secret key is unique for each website, the edge server 120 may retrieve the appropriate secret key associated with the resource to be accessed. In one embodiment, the hashing algorithm uses the expiration time with the secret key to generate the third token value. In such an embodiment, the first token value and the second token value were also generated previously by the edge server 120 using the expiration time and the secret key with the hashing algorithm.

As part of deriving the one or more other values from the request, the edge server 120 may extract the expiration time from the token value. For example, the edge server 120 may extract the expiration time from the token value when the expiration time is prepended or appended to the hash value as part of the token value.

The edge server 120 also derives additional data from the received request. For example, the edge server 120 may derive a user agent string, a device identifier, customer identifier, client host name, source IP address, and/or destination IP address from the received request. These one or more other values may be sent as part of the request and/or derived using data sent as part of the request.

For example, the IP address may be the source IP address associated with the received request (e.g., an IP address associated with the client computing device 110). The geo-location data associated with the client computing device 110 may be obtained using the IP address and performing a lookup of the geo-location associated with the IP address. A user agent string may provide additional information including, but not limited to, a browser identifier, a browser version, and an operating system running on the client computing device 110. The host origin name may be the resource being requested (e.g., www.example.com). In addition, the host origin name may be used to determine the customer identifier. For example, using the host origin name, the edge server 120 may perform a lookup operation using the host origin name, or alternatively, a destination IP address, to determine the corresponding customer identifier (e.g., owner of www.example.com). In some embodiments, the received request may also include a device identifier, such as a MAC address associated with the client computing device 110 that initiated the request.

At operation 245, the edge server 120 compares the first token value and the third token value to determine whether the first token value and the second token value both match the third token value. When the first token value and the second token value do not match the third token value, the flow continues to operation 255. The edge server 120 may not process the request received from the client computing device 110. At operation 255, when the first token value and/or the second token value do not match the third token value, as described above, the edge server 120 may return an error indication and does not process the request received from the client computing device 110. The edge server 120 may subsequently generate and send a response message to the client computing device 110 indicating that the request was rejected or could not be processed by the edge server 120.

At operation 250, when the first token value and the second token value match the third token value, the edge server 120 processes the request received from the client computing device 110. For example, the edge server 120 sends the request to the appropriate origin server 130 storing the requested resource. In another embodiment, the edge server 120 decrypts the request and performs a set of one or more operations on the decrypted request. For example, the edge server 120 may determine whether the requested resource is available in a cache to the edge server 120 and return the cached resource (encrypted) if available. As another example, if the origin server 130 for the destination hostname does not support secure sessions, then the edge server 120 may decrypt the request and transmit the request unencrypted to the origin server 130 for further processing.

Figure 3:
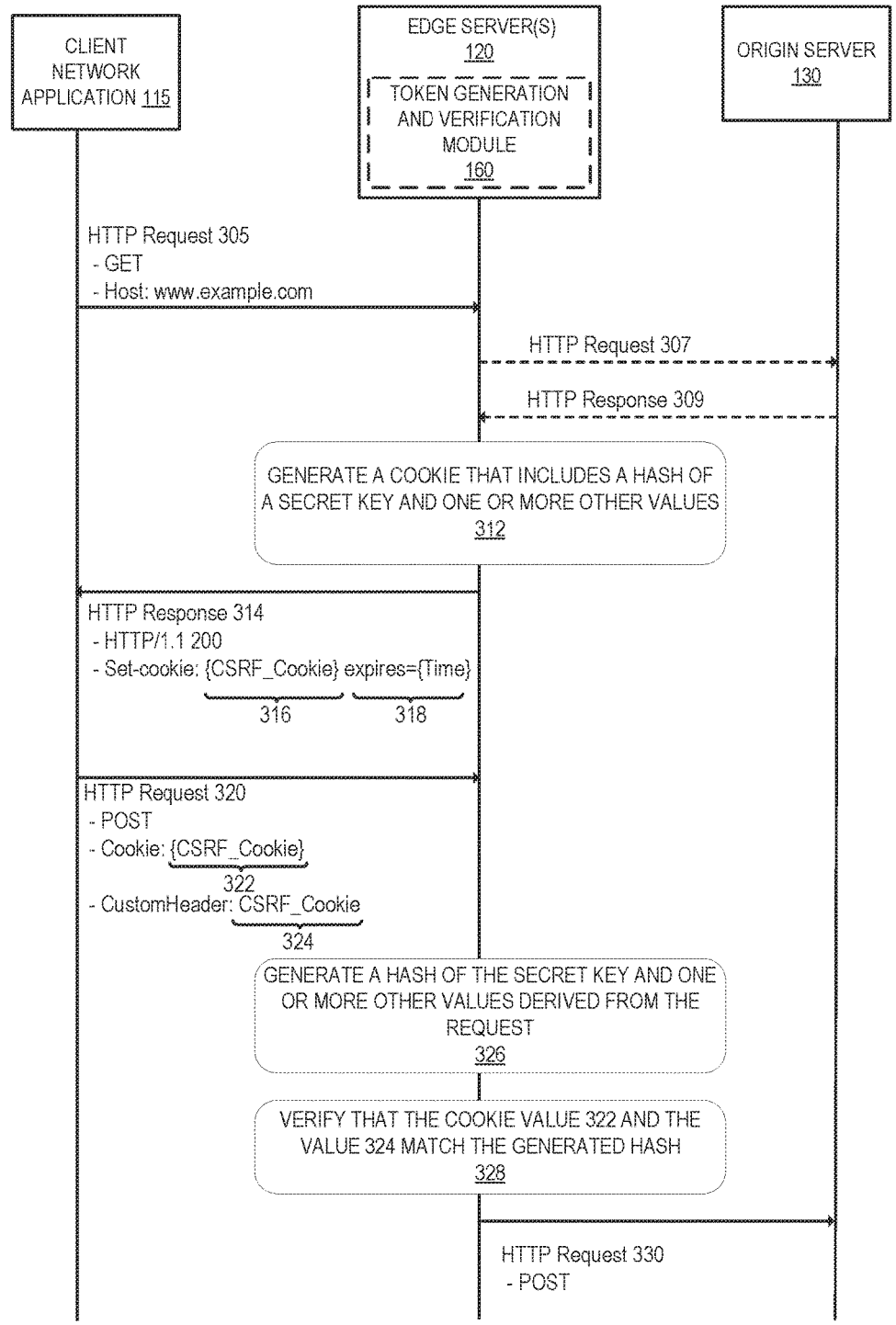
FIG. 3 is a flow diagram that illustrates exemplary data generated and sent between devices as part of operations to verify a request from a client computing device, according to one embodiment.

FIG. 3 is a flow diagram that illustrates exemplary data generated and sent between computing devices as part of operations to verify a request from a client computing device, according to one embodiment. At operation 305, the edge server 120 receives an HTTP request from a client network application 115 of a client computing device 110. In the example of operation 305, the HTTP request is a "GET" request to access a resource, www.example.com. In such an example, the edge server 120 may retrieve the requested resource (e.g., www.example.com). In some embodiments, in operation 307, the edge server 120 may send the HTTP request containing the "GET" request to the origin server 130. Next, at operation 309, the edge server 120 receives an HTTP response back from the origin server 130. In other embodiments, the edge server 120 may determine whether the requested resource, www.example.com, is available in a cache associated with the edge server 120. When the edge server 120 determines that the resource requested by the client computing device 110 is available in the cache, the edge server 120 can retrieve and return the cached resource without sending the request to the origin server 130.

At operation 312, the edge server 120 generates a cookie that includes a hash of a secret key and one or more other values. The operation to generate the cookie may be performed by a token generation and verification module 160 associated with the edge server 120. For example, the token value may include a hash value that may be generated by hashing the secret key and the one or more other values using a hash algorithm. The one or more other values may include an expiration time value, an IP address, a browser identifier, a host origin name, geo-location data, a device identifier, a user agent string, and other authentication data. The cookie may also include the expiration time value either prepended or appended to the hash value.

At operation 314, the edge server 120 sends the HTTP response back to the client network application 115 of the client computing device 110 that made the HTTP request containing the "GET" request. The HTTP response from the edge server 120 in operation 314 includes the cookie generated by the edge server 120. The cookie may include the token value ("CSRF_Cookie" 316) and one or more other values, including the expiration time for the token value ("expires={Time}" 318).

In some embodiments, the edge server 120 may modify code of the resource to cause the token value (equal to the value of the "CSRF Cookie" 316) to be transmitted to the edge server 120 in addition to transmitting the cookie. For example, the edge server 120 may modify the code of the resource to include a client-side script that, when executed by the client computing device 110, causes the client computing device 110 to transmit the token value (equal to the value of the "CSRF_Cookie" 316) as part of the request. This token value may be submitted automatically as an HTTP request header, or as part of HTML form data by adding a hidden field to all HTML forms on the resource. In other embodiments, the resource, as retrieved from the origin server 130 by the edge server 120, includes the code to include the client-side script that causes the client computing device 110 to transmit the token value to the edge server 120 as part of the request.

At operation 320, the edge server 120 receives an HTTP request from the client network application 115 of the client computing device 110. In the example of operation 320, the HTTP request is a "POST" request (a state-changing request). For example, the HTTP "POST" request may be a request to upload a file or submit data such as when completing a web form. The HTTP request in operation 320 may also include a cookie containing a token value ("CSRF_Cookie" 322). Token value "CSRF_Cookie" 322 may be the same token value as was sent by the edge server 120 to the client network application 115 of the client computing device 110 in operation 314. In addition, the HTTP request in operation 320 includes a custom header of the HTTP containing token value "CSRF_Cookie" 324. In other embodiments, instead of the custom header of the HTTP request containing the token value, the token value may be included in the body of the HTTP request, or separately transmitted by a client-side script. The HTTP request may also include at least some of the one or more other values described previously.

In operation 326, the edge server 120 generates a hash of the secret key and the one or more other values derived from the HTTP request. The edge server 120 generates the hash value by hashing the secret key and the one or more other values derived from the request using the hash algorithm. The secret key may be retrieved by the edge server 120 based on the corresponding origin server associated with the request or based on the resource being requested. In one embodiment, the secret key may be uniform for all resources.

The edge server 120 may derive the one or more other values from the received request. As described previously, the expiration time may be prepended or appended to the hash value, and subsequently extracted from the token value. For example, the expiration time may be appended or prepended to the hash value as plain text. In some embodiments, the expiration time may be sent to the edge server 120 in any suitable manner that allows the edge server 120 to have access to the expiration time. In addition, as described above the one or more other values may also be derived based on data included in the received request.

In operation 328, after the hash has been generated by the edge server 120, the edge server 120 verifies that the token values, "CSRF_Cookie" 322 and "CSRF_Cookie" 324, matches the hash value generated in operation 326. When the generated hash matches the two token values, the edge server 120 processes the request received from the client computing device 110. For example, in operation 330, the edge server 120 sends the HTTP POST request to the appropriate origin server 130. When there is not a match, the edge server 120 does not send the HTTP request to the origin server 130.

In some embodiments, the edge server 120 may ignore the token value received in an HTTP request when the request is a non-state-changing request, such as a "GET" request. In such a case, the verification process may be bypassed by the edge server 120, as the request is not to modify or submit data. In contrast, when the request is a state-changing request, such as a "POST", "DELETE", "PUT", or "PATCH" request, the verification process may not be bypassed by the edge server 120 and the verification process is performed. In other embodiments, regardless of whether the request is a state-changing request or a non-state-changing request, the verification process is performed by the edge server 120.

Figure 4:
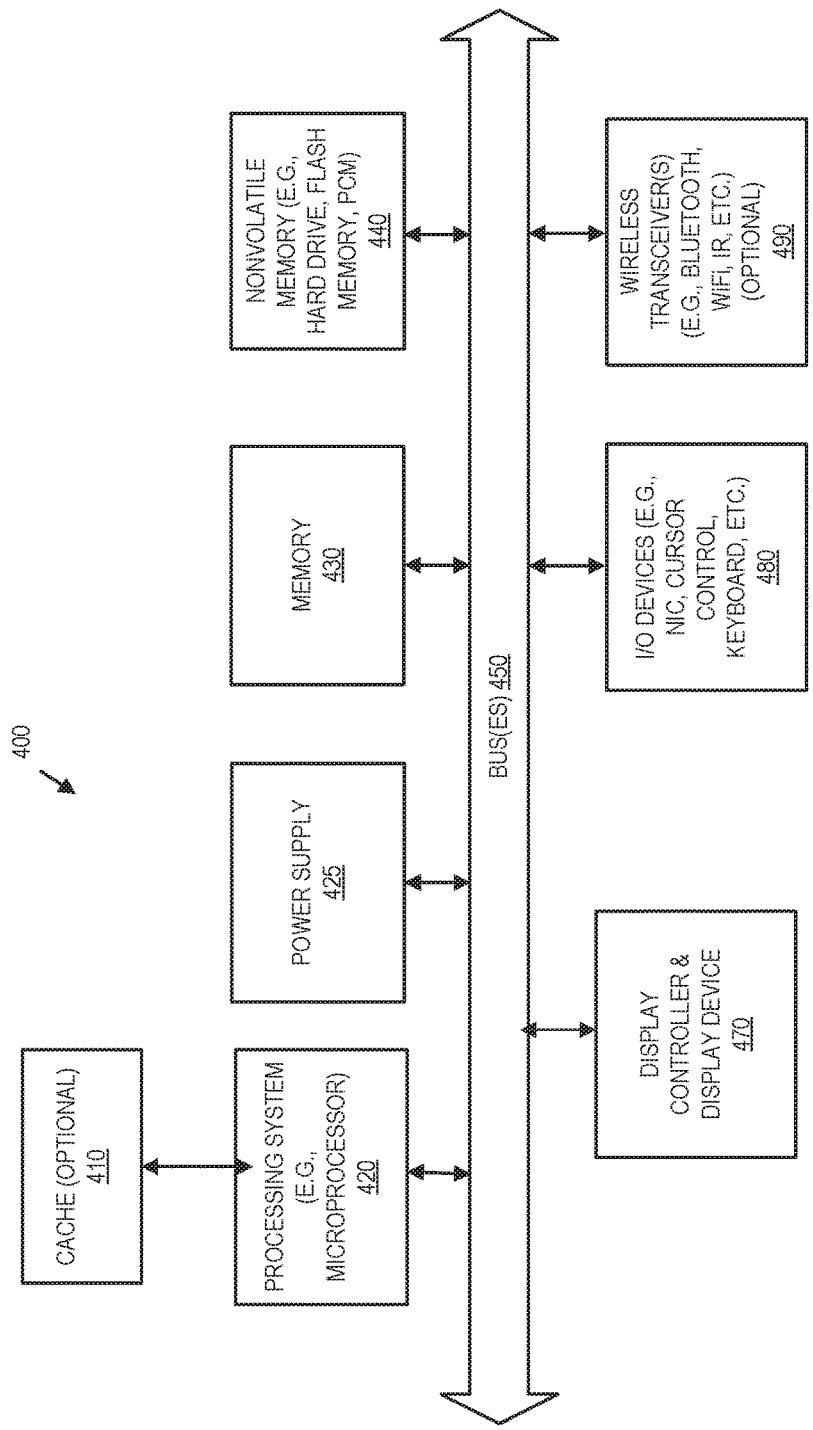
FIG. 4 is a block diagram illustrating a data processing system that can be used in an embodiment.

As illustrated in FIG. 4, the computer system 400, which is a form of a data processing system, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420 may retrieve instruction(s) from the memory 430 and/or the nonvolatile memory 440, and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, Wi-Fi, Infrared, etc.). In one embodiment, the client device, caching system, and/or service device described herein may take the form of the computer system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
generating, by an edge server, a first token value that includes a hash value generated by hashing a secret key and one or more other values using a hash algorithm;
including the first token value in a first cookie;
sending the first cookie to a client device, wherein the first cookie does not include the secret key;
receiving, from the client device, a request for an action to be performed on a resource that is hosted at an origin server, the request including a second cookie and a second token value;
extracting, from the second cookie, the one or more other values, wherein the one or more other values include an expiration time and one or more metadata, and wherein the one or more metadata includes one or more of an IP address, a browser identifier, a host origin name, geo-location data, a device identifier, a user agent string, and other authentication data;
generating a third token value by hashing the secret key and the extracted one or more other values using the hash algorithm;
comparing the first token value and the third token value to determine whether the first token value matches the third token value;
comparing the second token value and the third token value to determine whether the second token value matches the third token value; and
sending the request to the origin server in response to determining that the first token value and the second token value match the third token value.

2. The method of claim 1, further comprising:
modifying code of the resource to include a client-side script that, when executed by the client device, causes the client device to transmit the second token value as part of the request.

3. The method of claim 1, wherein extracting the one or more other values from the second cookie further comprises:
verifying a format of the second cookie matches an expected format.

4. The method of claim 1, wherein the second token value is included in one of a body of the request and an HTTP request header of the request.

5. The method of claim 1, wherein the request for the action to be performed is a state-changing request for the resource.

6. A non-transitory machine-readable storage medium that provides instructions that, when executed by a processor, cause said processor to perform operations comprising:
generating, by an edge server, a first token value that includes a hash value generated by hashing a secret key and one or more other values using a hash algorithm;
including the first token value in a first cookie;
sending the first cookie to a client device, wherein the first cookie does not include the secret key;
receiving, from the client device, a request for an action to be performed on a resource that is hosted at an origin server, the request including a second cookie and a second token value;
extracting, from the second cookie, the one or more other values, wherein the one or more other values include an expiration time and one or more metadata, and wherein the one or more metadata includes one or more of an IP address, a browser identifier, a host origin name, geo-location data, a device identifier, a user agent string, and other authentication data;
generating a third token value by hashing the secret key and the extracted one or more other values using the hash algorithm;
comparing the first token value and the third token value to determine whether the first token value matches the third token value;
comparing the second token value and the third token value to determine whether the second token value matches the third token value; and
sending the request to the origin server in response to determining that the first token value and the second token value match the third token value.

7. The non-transitory machine-readable storage medium of claim 6 that provides instructions that, when executed by the processor, cause the processor to further perform operations comprising:
modifying code of the resource to include a client-side script that, when executed by the client device, causes the client device to transmit the second token value as part of the request.

8. The non-transitory machine-readable storage medium of claim 6, wherein extracting the one or more other values from the second cookie further comprises:

verifying a format of the second cookie matches an expected format.

9. The non-transitory machine-readable storage medium of claim 6, wherein the second token value is included in one of a body of the request and an HTTP request header of the request.

10. The non-transitory machine-readable storage medium of claim 6, wherein the request for the action to be performed is a state-changing request for the resource.

11. An apparatus, comprising:
a processor;
a non-transitory machine-readable storage medium coupled with the processor that stores instructions that, when executed by the processor, cause said processor to perform the following:
generate, by an edge server, a first token value that includes a hash value generated by hashing a secret key and one or more other values using a hash algorithm;
include the first token value in a first cookie;
send the first cookie to a client device, wherein the first cookie does not include the secret key;
receive, from the client device, a request for an action to be performed on a resource that is hosted at an origin server, the request including a second cookie and a second token value;
extract, from the second cookie, the one or more other values, wherein the one or more other values is to include an expiration time and one or more metadata, and wherein the one or more metadata is to include one or more of an IP address, a browser identifier, a host origin name, geo-location data, a device identifier, a user agent string, and other authentication data;
generate a third token value by hashing the secret key and the extracted one or more other values using the hash algorithm;
compare the first token value and the third token value to determine whether the first token value matches the third token value;
compare the second token value and the third token value to determine whether the second token value matches the third token value; and
send the request to the origin server in response to determining that the first token value and the second token value match the third token value.

12. The apparatus of claim 11, wherein the instructions further cause said processor to perform the following:
modify code of the resource to include a client-side script that, when executed by the client device, causes the client device to transmit the second token value as part of the request.

13. The apparatus of claim 11, wherein extracting the one or more other values from the second cookie further comprises:
verifying a format of the second cookie matches an expected format.

14. The apparatus of claim 11, wherein the second token value is included in one of a body of the request and an HTTP request header of the request.

15. The apparatus of claim 11, wherein the request for the action to be performed is a state-changing request for the resource.

* * * * *